United States Patent
Kanner et al.

(10) Patent No.: US 9,618,909 B2
(45) Date of Patent: Apr. 11, 2017

(54) SAFETY ASSURANCE OF MULTIPLE REDUNDANT SYSTEMS

(71) Applicant: Thales Canada Inc, Toronto, Ontario (CA)

(72) Inventors: Abe Kanner, Mississauga (CA); David Doyle, North York (CA)

(73) Assignee: Thales Canada Inc, Toronto, Ontario (CA)

(*) Notice: Subject to any disclaimer, the term of this patent is extended or adjusted under 35 U.S.C. 154(b) by 558 days.

(21) Appl. No.: 14/137,134

(22) Filed: Dec. 20, 2013

(65) Prior Publication Data
US 2015/0177706 A1    Jun. 25, 2015

(51) Int. Cl.
G05B 9/03 (2006.01)
G06F 11/20 (2006.01)

(52) U.S. Cl.
CPC ............ *G05B 9/03* (2013.01); *G06F 11/2005* (2013.01)

(58) Field of Classification Search
None
See application file for complete search history.

(56) References Cited

U.S. PATENT DOCUMENTS

| | | | |
|---|---|---|---|
| 4,984,240 A * | 1/1991 | Keren-Zvi | G06F 11/2005 340/2.9 |
| 5,142,470 A * | 8/1992 | Bristow | G06F 11/2097 700/79 |
| 5,202,822 A * | 4/1993 | McLaughlin | G06F 11/2097 700/82 |
| 5,581,246 A | 12/1996 | Yarberry et al. | |
| 5,630,053 A * | 5/1997 | Morikawa | G05B 9/03 714/11 |
| 5,777,874 A | 7/1998 | Flood et al. | |
| 6,236,553 B1 | 5/2001 | Widell | |
| 6,351,829 B1 * | 2/2002 | Dupont | G06F 11/0736 714/11 |
| 6,425,094 B1 | 7/2002 | Drogichen et al. | |
| 6,754,846 B2 | 6/2004 | Rasmussen et al. | |
| 6,788,213 B2 | 9/2004 | Menard | |
| 6,845,467 B1 * | 1/2005 | Ditner | G05B 19/0428 714/10 |
| 6,879,889 B2 | 4/2005 | Ross | |
| 6,952,618 B2 | 10/2005 | Davlin et al. | |
| 7,328,369 B2 | 2/2008 | Manoni | |
| 7,411,319 B2 | 8/2008 | Suhara et al. | |
| 7,472,106 B2 | 12/2008 | Muneta et al. | |

(Continued)

OTHER PUBLICATIONS

International Search Report for corresponding International PCT Application No. PCT/IB2014/063530, dated Sep. 18, 2014.

*Primary Examiner* — Christopher E Everett

(74) *Attorney, Agent, or Firm* — Hauptman Ham, LLP

(57) ABSTRACT

A system, method, and safety unit provide safety assurance for a multiple redundant system controlling a plant or complex. A unit active line (UAL) status indicates the presence of at least one redundant active unit within the system. A safety verification line (SVL) status verifies the powered down status of all redundant units not active within the system. A safety unit is associated with a vital supervision card (VSC) and vital power bus and the safety unit controls switchable connections from the vital power bus to the UAL and the SVL. Based on verification of UAL and SVL status, system control includes energizing the UAL.

17 Claims, 3 Drawing Sheets

(56) References Cited

U.S. PATENT DOCUMENTS

| | | |
|---|---|---|
| 7,550,867 B2 | 6/2009 | Kalb |
| 7,774,074 B2 | 8/2010 | Davlin et al. |
| 8,278,938 B2 | 10/2012 | Sexton et al. |
| 2003/0002612 A1* | 1/2003 | Menard .................... G05B 9/02 376/215 |
| 2007/0228223 A1* | 10/2007 | Dittmar ................ B61L 5/1881 246/28 R |
| 2009/0070639 A1* | 3/2009 | Langford ............ G06F 11/0709 714/57 |
| 2011/0276285 A1* | 11/2011 | Alexander ............ B61L 5/1881 702/58 |
| 2012/0259475 A1 | 10/2012 | Scharnick |
| 2012/0325981 A1 | 12/2012 | Lostun et al. |
| 2013/0154553 A1 | 6/2013 | Steele |

\* cited by examiner

SAFETY ASSURANCE OF MULTIPLE REDUNDANT SYSTEMS

BACKGROUND

In multiple redundant safety systems, multiple safety units are each capable of assuming control of a plant or complex in an active/master state while the redundant units not in control are in a passive/slave state. If failure of an active/master unit is detected, the failed unit is removed from control while a redundant unit assumes control.

Fundamental to keeping a plant or complex safe if a redundant safety computer assumes control is ensuring that any failed unit does not interfere or attempt to assume control of the plant or complex before it can be repaired. Although a failed unit is disconnected prior to repair, subsequent failures could occur that could be dormant and thus undetectable; these failures can affect the safety of the plant or complex.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

The present description concerns a safety assurance system and uses thereof. Although subject to other uses, the safety assurance system is suitable to a multiple redundant safety unit application in which each redundant safety unit is able to initiate and maintain control of a plant or complex that includes the safety assurance system. Such complexes include railway signaling systems but can be any plant or system in which multiple redundant controllers are each capable of initiating and maintaining safe system control.

Figure 1:
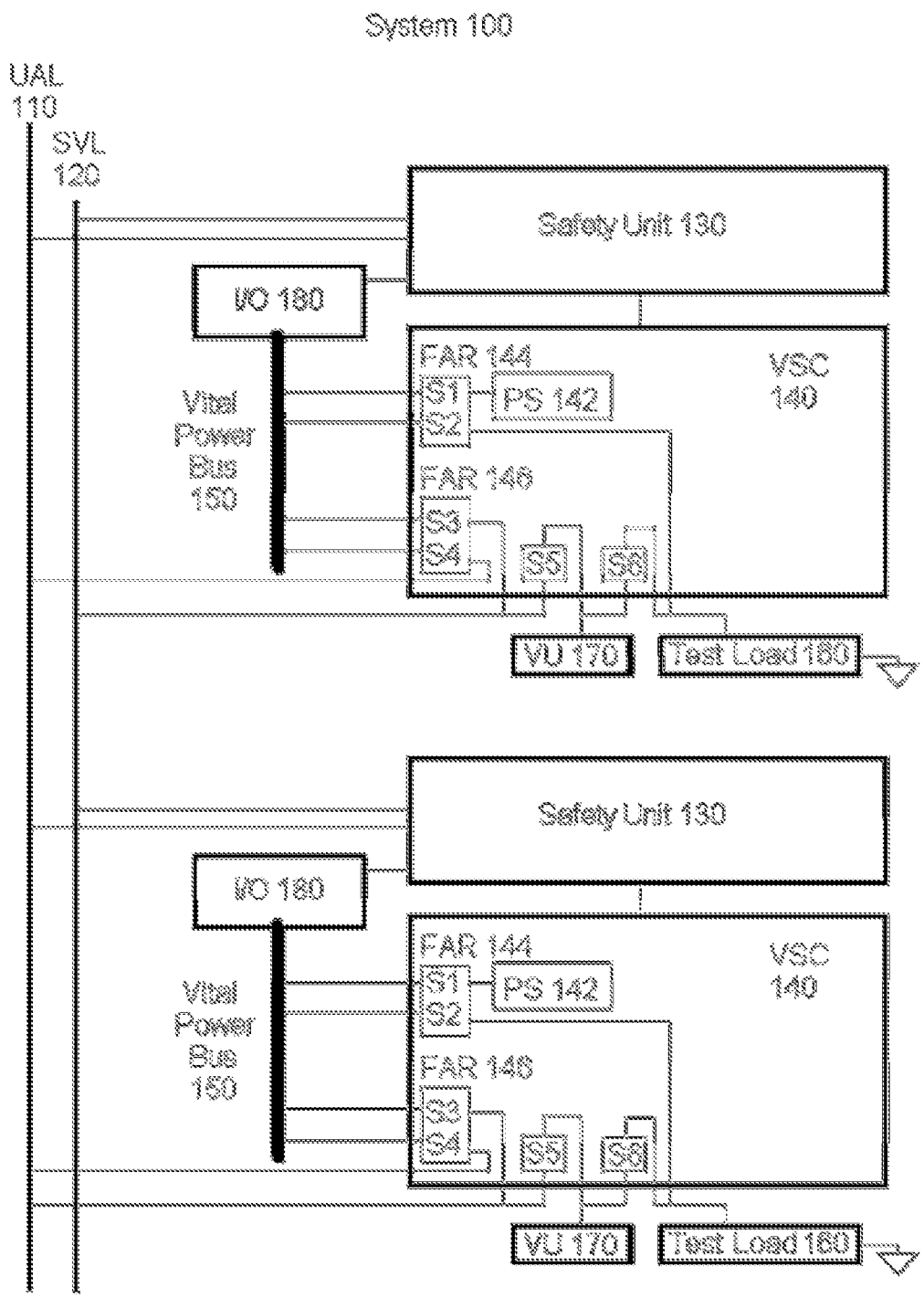
FIG. 1 is a schematic drawing of a safety system having multiple redundant safety units, in some embodiments, showing a plurality of safety units linked by two status lines.

Referring to FIG. 1, safety assurance system 100 comprises a unit active line (UAL) 110, a safety verification line (SVL) 120, at least two safety units 130 linked to UAL 110 and SVL 120, each safety unit 130 associated with a vital supervision card (VSC) 140 and a vital power bus 150.

UAL 110 is a hardware component or assembly configured as a path for communicating a status indication between multiple safety units. In some embodiments, a status indication is an electrical signal and UAL 110 is a wire, cable, printed circuit board trace, or combination thereof. In some embodiments, a status indication is an electromagnetic signal and UAL 110 is a wired and/or wireless transmission path. In some embodiments, a status indication is an optical signal and UAL 110 is a fiber cable.

SVL 120 is a hardware component or assembly configured as a path for communicating a status indication between multiple safety units. In some embodiments, a status indication is an electrical signal and SVL 120 is a wire, cable, printed circuit board trace, or combination thereof. In some embodiments, a status indication is an electromagnetic signal and SVL 120 is a wired and/or wireless transmission path. In some embodiments, a status indication is an optical signal and SVL 120 is a fiber cable.

In some embodiments, UAL 110 and SVL 120 are essentially identical hardware components or assemblies. In some embodiments, UAL 110 and SVL 120 are differing hardware components or assemblies.

Safety unit 130 is a processor-based unit capable of controlling a multiple redundant system. In some embodiments, safety unit 130 is a computing device. Safety unit 130 is configured to function either as an active/master (A/M) unit while initiating or maintaining system control or as a passive/slave (P/S) unit while not initiating or maintaining system control. In use, safety unit 130 responds to a safety verification failure by terminating system control.

Figure 3:
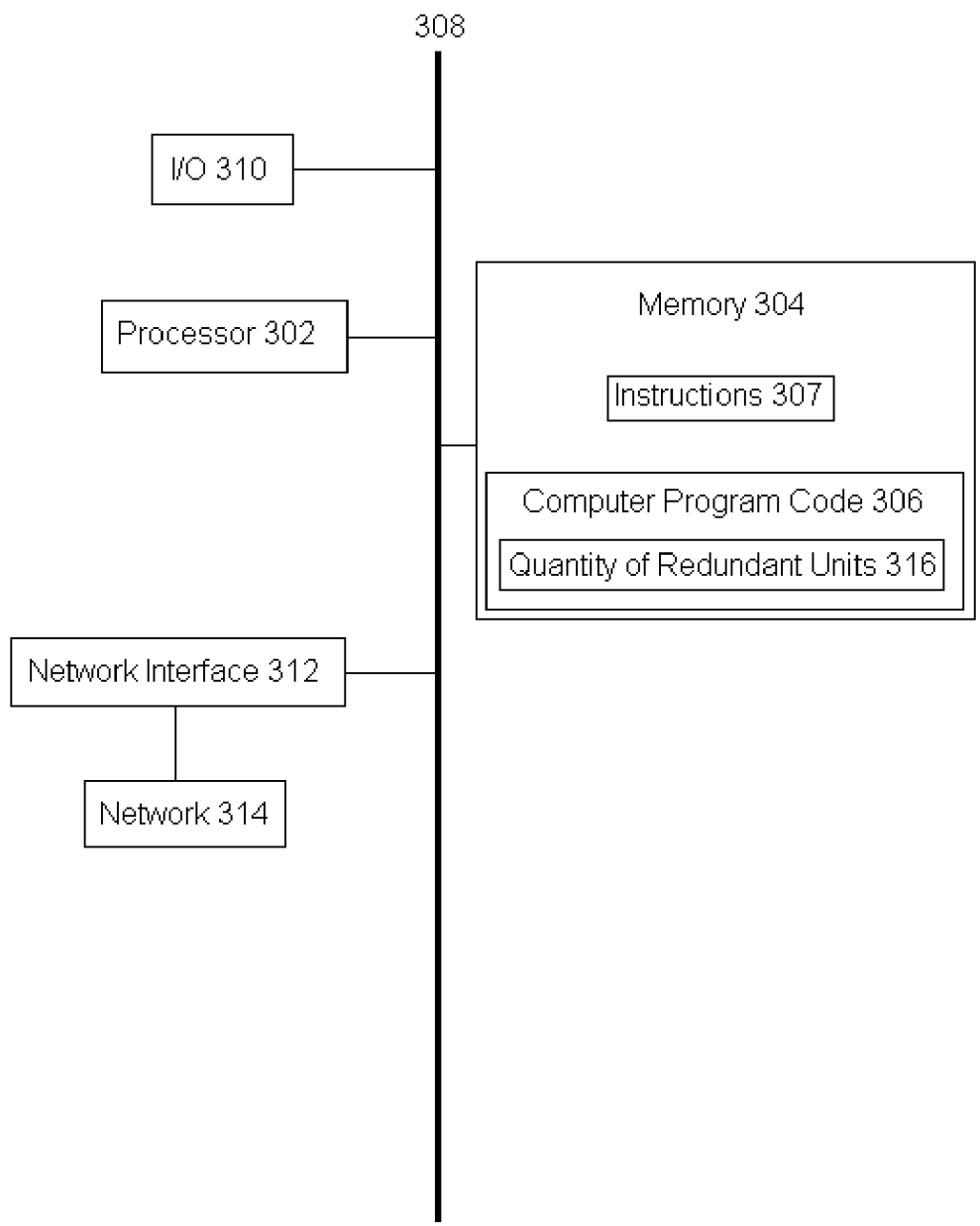
FIG. 3 is a functional block diagram of a safety unit usable for implementing a method in accordance with one or more embodiments.

In some embodiments, safety unit 130 is safety unit 300 depicted in FIG. 3. In some embodiments, all safety units 130 have identical hardware configurations. In some embodiments, safety units 130 have differing hardware configurations but are configured similarly with respect to the functions described for the various embodiments.

Safety unit 130 is configured to determine the status of each of UAL 110 and SVL 120. In some embodiments, safety unit 130 is configured to determine the status through an electrical connection on which sensing a voltage indicates whether or not a line is energized. In some embodiments, the electrical connection is a direct connection by wire, cable, or printed circuit board trace. In some embodiments, safety unit 130 is configured to determine the status through an indirect connection including one or more buffers or wired or wireless signaling circuits. In at least some embodiments, safety unit 130 is configured to determine the status through an electrical connection on which sensing a current indicates whether or not a line is energized.

Safety unit 130 is configured to determine the status of vital power bus 150. In some embodiments, safety unit 130 is configured to determine the status through an electrical connection on which sensing a voltage indicates whether or not a line is energized. In some embodiments, safety unit 130 is configured to determine the status through an electrical connection on which sensing a current indicates whether or not a line is energized. In some embodiments, the electrical connection is a direct connection by wire, cable, or printed circuit board trace. In some embodiments, safety unit 130 is configured to determine the status through an indirect connection including one or more buffers or wired or wireless signaling circuits.

Vital supervision card (VSC) 140 is a device that comprises an input configured to receive one or more electronic signals, a logic component configured to analyze the one or more signals and generate one or more control signals, an output configured to send the one or more control signals, and one or more relays or other controllable switching connections. The logic component can be a combination of hardware or hardware and software. The input and output can be an interface capable of receiving and sending one or more electronic signals.

In use, VSC 140 receives at least one input signal and, in response, the logic component causes the one or more control signals to be generated. In the case in which all input signals are received as expected, the logic component causes vital power bus 150 to be energized.

In some embodiments, vital power bus 150 is energized by power supply 142 on VSC 140. In some embodiments, vital power bus 150 is energized by a separate power supply. In some embodiments, VSC 140 control signals are used to control switchable connection S1 on VSC 140 to energize vital power bus 150. In some embodiments, VSC 140 control signals are output to one or more external switchable connections to energize vital power bus 150.

A switchable connection is a solid state or mechanical device capable of opening and closing a signal path in response to a control signal. In some embodiments, a switchable connection is a contact on a relay. In some embodiments, a switchable connection is one of two contacts in a single relay. In some embodiments, the single relay is a force activated relay (FAR) that, by design, prevents both front and rear (energized and de-energized) contacts from being closed simultaneously, thereby ensuring antivalent (mutually exclusive) operation.

Safety unit 130 is configured to communicate with and control VSC 140 by outputting electronic signals received by VSC 140. Safety unit 130 is configured to control switchable connections between vital power bus 150 and each of UAL 110 and SVL 120.

In some embodiments, switchable connection S4 on VSC 140 is configured to connect vital power bus 150 to UAL 110. In some embodiments, an external switchable connection under the control of safety unit 130 is configured to connect vital power bus 150 to UAL 110.

In some embodiments, switchable connection S3 on VSC 140 is configured to connect vital power bus 150 to SVL 120. In some embodiments, an external switchable connection under the control of safety unit 130 is configured to connect vital power bus 150 to SVL 120.

In some embodiments, switchable connection S3 and switchable connection S4 are configured for antivalent operation. In some embodiments, switchable connection S3 and switchable connection S4 are antivalent contacts of FAR 146 on VSC 140. In some embodiments, switchable connection S3 and switchable connection S4 are antivalent contacts of FAR 146 on VSC 140 in which switchable connection S3 is normally open and switchable connection S4 is normally closed. In use, antivalent operation of switchable connection S3 and switchable connection S4 ensures that vital power bus 150 is connected to either UAL 110 or SVL 120, but not to both UAL 110 and SVL 120 simultaneously. This configuration is verified by the safety unit 130.

In some embodiments, S3 and S4 are configured so that S3 is closed and S4 is open when VSC 140 is in a powered down state. In use, this configuration ensures that a de-energized vital power bus 150 is normally connected to SVL 120.

In some embodiments, in use, this configuration enables a safety unit 130 to verify that no other units are attempting to assert control or malfunctioning in such a way that another unit's vital power bus becomes energized. In some embodiments, in use, this verification is based on an expected state of a sole active/master unit 130 having an energized vital power bus 150 connected to UAL 110 through switchable connection S4 and each passive/slave unit 130 having a de-energized vital power bus 150 connected to SVL 120 through switchable connection S3. In use, verification of an expected state provides assurance of safe control while any deviation from an expected state indicates a potential safety issue. In various embodiments, in use, further assurance is provided by the additional features described below.

In some embodiments, test load 160 is a passive or active component capable of being detected or measured by a signal. In the embodiment depicted in FIG. 1, test load 160 is a two-terminal device with one terminal grounded. In some embodiments, the two-terminal device is a resistor. In some embodiments, an identical resistor is associated with each safety unit 130. In some embodiments, resistors of varying values are associated with various safety units 130.

In some embodiments, an accessible terminal of test load 160 is configured to be switchably connected to vital power bus 150. In some embodiments, the switchable connection between the accessible terminal of test load 160 and vital power bus 150 is controlled by safety unit 130. In some embodiments, switchable connection S2 on VSC 140 is configured to switchably connect the accessible terminal of test load 160 to vital power bus 150. In some embodiments, an external switchable connection under the control of safety unit 130 is configured to switchably connect the accessible terminal of test load 160 to vital power bus 150.

In some embodiments, the switchable connection between the accessible terminal of test load 160 and vital power bus 150 is antivalent to the switchable connection between the power supply and vital power bus 150. In some embodiments, in use, this antivalent operation ensures that vital power bus 150 is connected to either the power supply or the accessible terminal of test load 160, but not both the power supply and the accessible terminal of test load 160 simultaneously. In some embodiments, switchable connection S1 between power supply 142 and vital power bus 150 and switchable connection S2 between the accessible terminal of test load 160 and vital power bus 150 are contacts of FAR 144 on VSC 140. In some embodiments, switchable connection S1 between power supply 142 and vital power bus 150 and switchable connection S2 between the accessible terminal of test load 160 and vital power bus 150 are contacts of FAR 144 on VSC 140 in which switchable connection S1 is normally open and switchable connection S2 is normally closed.

In some embodiments, in use, antivalent operation of FAR 144 and FAR 146 combined with a de-energized closed state for S3 ensure that test load 160 for each de-energized VSC 140 is connected to SVL 120. In those embodiments in which test load 160 is a two-terminal, grounded test load, this configuration places test loads 160 in parallel for all de-energized VSCs 140. In those embodiments in which test load 160 is a grounded resister, this configuration places resistors in parallel for all de-energized VSCs 140.

In some embodiments, verification unit 170 is any circuit capable of verifying or measuring test load 160. In some embodiments, verification unit 170 is a current sensing circuit configured to measure resistance. In some embodiments, verification unit 170 is switchably connected to the accessible terminal of test load 160. In some embodiments the switchable connection between verification unit 170 and the accessible terminal of load 160 is controlled by safety unit 130. In some embodiments, switchable connection S6 on VSC 140 is configured to switchably connect verification unit 170 to the accessible terminal of test load 160. In some embodiments, switchable connection S6 on VSC 140 is a normally open contact of a FAR. In some embodiments, an external switchable connection under the control of safety unit 130 is configured to switchably connect verification unit 170 to the accessible terminal of test load 160.

In some embodiments, verification unit 170 is switchably connected to SVL 120. In some embodiments the switchable connection between verification unit 170 and SVL 120 is controlled by safety unit 130. In some embodiments, switchable connection S5 on VSC 140 is configured to switchably connect verification unit 170 to SVL 120. In some embodiments, switchable connection S5 on VSC 140 is a normally open contact of a FAR. In some embodiments, an external switchable connection under the control of safety unit 130 is configured to switchably connect verification unit 170 to SVL 120.

In some embodiments, in use, verification unit 170 is configured to verify test load 160 with switchable connection S2 open, switchable connection S6 closed, and switchable connection S5 open. In this configuration, in use, verification unit 170 verifies the individual test load 160 associated with safety unit 130. In some embodiments, with switchable connection S2 open, switchable connection S6 closed, and switchable connection S5 open, verification unit 170 is a current sensing circuit configured to measure resistance of resistive load 160. In this configuration, in use, the current sensing circuit measures the resistance of the individual resister associated with safety unit 130.

In some embodiments, in use, verification unit 170 is configured to verify parallel test loads 160 for all de-energized VSCs 140. With switchable connection S2 open, switchable connection S6 closed, and switchable connection S5 closed, all test loads 160 are connected to SVL 120, which is also connected to verification unit 170. In some embodiments, with switchable connection S2 open, switchable connection S6 closed, and switchable connection S5 closed, verification unit 170 is a current sensing circuit configured to measure resistance. In this configuration, the measured resistance is the parallel resistance all resisters associated with safety units 130.

In some embodiments, vital power bus 150 is configured to be electrically connected to input/output (I/O) 180 such that, in use, energizing vital power bus 150 energizes I/O 180. In some embodiments, I/O 180 is the interface between safety unit 130 and the complex under control of the redundant safety units. In use, de-energizing I/O 180 therefore disables control by safety unit 130.

Figure 2:
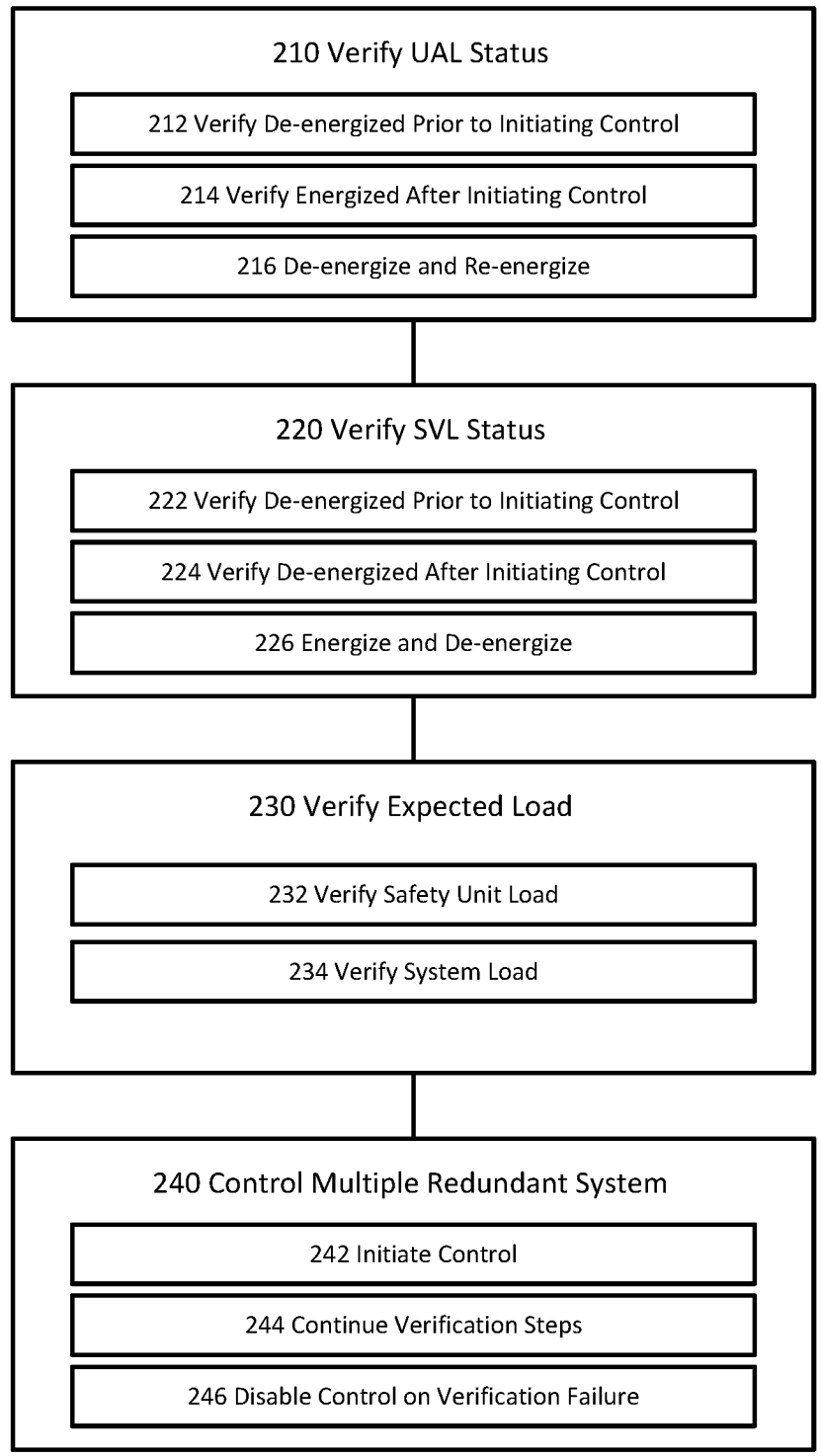
FIG. 2 is a flow chart for a method of assuring safety for a multiple redundant system, in some embodiments.

The present description also concerns a method of assuring safety for a multiple redundant system. An example embodiment of a method of assuring safety for a multiple redundant system is depicted in FIG. 2. Various embodiments comprise some or all of the steps depicted in FIG. 2.

In step 210, on a safety unit, UAL status is verified. In various embodiments, verifying UAL status comprises any or all of steps 212, 214, and 216. In various embodiments, a safety unit verifies a UAL status during any or all of steps 212, 214, and 216 by sensing a UAL voltage corresponding to an energized or de-energized UAL state.

In step 212, in some embodiments, prior to initiating control, a safety unit verifies that a UAL is de-energized, thereby ensuring that no other safety unit is attempting to assert or already asserting control.

In step 214, in some embodiments, after initiating control, a safety unit verifies that a UAL is energized by the safety unit itself. In some embodiments, verifying an energized UAL is performed continuously. In some embodiments, verifying an energized UAL is performed periodically. In some embodiments, verifying an energized UAL is performed continuously but with interruptions for performing step 216 as described below.

In step 216, in some embodiments, a safety unit verifies UAL status by de-energizing and re-energizing a UAL while monitoring UAL status. In some embodiments, de-energizing and re-energizing a UAL is performed periodically. In some embodiments, de-energizing and re-energizing a UAL is performed periodically with the period based on a safety integrity level and/or failure probabilities. In some embodiments, de-energizing and re-energizing a UAL is achieved by controlling a switchable connection from a vital power bus to the UAL.

In step 220, on a safety unit, SVL status is verified. In various embodiments, verifying SVL status comprises any or all of steps 222, 224, and 226. In various embodiments, a safety unit verifies an SVL status during any or all of steps 222, 224, and 226 by sensing an SVL voltage corresponding to an energized or de-energized SVL state.

In step 222, in some embodiments, prior to initiating control, a safety unit verifies that an SVL is de-energized, thereby ensuring that no other safety unit has an energized vital power bus, i.e. no other unit is already in control.

In step 224, in some embodiments, after initiating control, a safety unit verifies that an SVL is de-energized by the safety unit. In some embodiments, verifying a de-energized SVL is performed continuously. In some embodiments, verifying a de-energized SVL is performed periodically. In some embodiments, verifying a de-energized SVL is performed continuously but with interruptions for performing step 226 as described below.

In step 226, in some embodiments, a safety unit verifies SVL status by energizing and de-energizing an SVL while monitoring SVL status. In some embodiments, energizing and de-energizing an SVL is performed periodically. In some embodiments, energizing and de-energizing an SVL is performed periodically with the period based on a safety integrity level and/or failure probabilities. In some embodiments, energizing and de-energizing an SVL is achieved by controlling a switchable connection from a vital power bus to the SVL.

In step 230, on a safety unit, an expected test load is verified. In various embodiments, verifying an expected test load comprises either or both of steps 232 and 234. In some embodiments, step 232 serves to confirm proper operation and calibrate a verification unit prior to step 234.

In step 232, a safety unit verifies a test load associated with the safety unit. In some embodiments, the test load associated with the safety unit is a resistor and verifying the test load associated with the safety unit comprises measuring the resistor with a current sensing circuit. In some embodiments, verifying a test load associated with the safety unit comprises controlling a switchable connection between a verification unit and an accessible terminal of the test load. In some embodiments, verifying a test load associated with the safety unit also verifies the disconnection of the test load from a vital power bus. In some embodiments, verifying a test load associated with the safety unit also verifies operation of the verification unit.

In step 234, a safety unit verifies a system test load. In some embodiments, a system test load is a known quantity of parallel resistors and verifying system test load comprises measuring the parallel resistors with a current sensing circuit. In some embodiments, verifying a system test load comprises controlling a switchable connection between a verification unit and an accessible terminal of the test load and a switchable connection between the verification unit and an SVL, the SVL connected to terminals of parallel test loads. In some embodiments, verifying a system test load also verifies operation of the switchable connections between an SVL and parallel test loads. In some embodiments, step 234 is preformed only after successful completion of step 234.

In step 240, a safety unit controls a multiple redundant system. In various embodiments, controlling a multiple redundant system comprises any or all of steps 242, 244, and 246.

In step 242, a safety unit initiates control of a multiple redundant system. In some embodiments, initiating control of a multiple redundant system comprises initiating control of a plant or complex. In some embodiments, initiating control of a multiple redundant system comprises energizing a vital power bus. In some embodiments, initiating control of a multiple redundant system comprises disconnecting a test load from a vital power bus. In some embodiments, initiating control of a multiple redundant system comprises connecting a vital power bus to a UAL. In some embodiments, initiating control of a multiple redundant system comprises disconnecting a vital power bus from an SVL.

In step 244, a safety unit, after initiating control of a multiple redundant system, continues verification. In some embodiments, controlling a multiple redundant system comprises controlling a plant or complex. In various embodiments, continuing verification comprises any or all of steps 214, 216, 224, 226, and 230. In various embodiments, continuing verification comprises any or all of steps 214, 216, 224, 226, and 230 while controlling a plant or complex.

In step 246, a safety unit, in response to a verification failure, disables control. In various embodiments, a verification failure is any combination of failures of verification steps 210, 220, and 230. In some embodiments, disabling control comprises de-energizing I/O circuits associated with a safety unit and/or a VSC.

FIG. 3 is a block diagram of a safety unit 300 configured for safety assurance of a multiple redundant system in accordance with one or more embodiments. In some embodiments, safety unit 300 is similar to safety unit 130 (FIG. 1). Safety unit 300 includes a hardware processor 302 and a non-transitory, computer readable storage medium 304 encoded with, i.e., storing, the computer program code 306, i.e., a set of executable instructions. Computer readable storage medium 304 is also encoded with instructions 307 for interfacing with elements of safety unit 300. The processor 302 is electrically coupled to the computer readable storage medium 304 via a bus 308. The processor 302 is also electrically coupled to an I/O interface 310 by bus 308. A network interface 312 is also electrically connected to the processor 302 via bus 308. Network interface 312 is connected to a network 314, so that processor 302 and computer readable storage medium 304 are capable of connecting and communicating to external elements via network 314. In some embodiments, network interface 312 is replaced with a different communication path such as optical communication, microwave communication, inductive loop communication, or other suitable communication paths.

In some embodiments, network interface 312 is connected to I/O circuit of FIG. 1. In some embodiments, network interface 312 is connected to VSC 140 of FIG. 1.

The processor 302 is configured to execute the computer program code 306 encoded in the computer readable storage medium 304 in order to cause safety unit 300 to be usable for performing a portion or all of the operations as described with respect to safety assurance system 100 (FIG. 1) or a method 200 (FIG. 2).

In some embodiments, the processor 302 is a central processing unit (CPU), a multi-processor, a distributed processing system, an application specific integrated circuit (ASIC), and/or a suitable processing unit. In some embodiments, processor 302 is configured to receive detection and loss of detection information signals and number of wheel revolutions information signals via network interface 312. In some embodiments, processor 302 is configured to generate vehicle control information signals for transmitting to external circuitry via network interface 312.

In some embodiments, the computer readable storage medium 304 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-RAN), and/or a digital video disc (DVD). In some embodiments, the computer readable storage medium 404 is part of an embedded microcontroller or a system on chip (SoC).

In some embodiments, the storage medium 304 stores the computer program code 306 configured to cause safety unit 300 to perform the operations as described with respect to safety assurance system 100 (FIG. 1) or method 200 (FIG. 2). In some embodiments, the storage medium 304 also stores information needed for performing the operations as described with respect to safety assurance system 100, such as a quantity of redundant units parameter 316, and/or a set of executable instructions to perform the operation as described with respect to safety assurance system 100.

In some embodiments, the storage medium 304 stores instructions 307 for interfacing with external components. The instructions 307 enable processor 302 to generate operating instructions readable by the external components to effectively implement the operations as described with respect to dynamic wheel diameter determination system 100.

Safety unit 300 includes I/O interface 310. I/O interface 310 is coupled to external circuitry. In some embodiments, I/O interface 310 is configured to receive instructions from a port in an embedded controller.

Controller 300 also includes network interface 312 coupled to the processor 302. Network interface 312 allows safety unit 300 to communicate with network 314, to which one or more other computer systems are connected. Network interface 312 includes wireless network interfaces such as BLUETOOTH, WIFI, WIMAX, GPRS, or WCDMA; or wired network interface such as ETHERNET, USB, IEEE-1394, or asynchronous or synchronous communications links, such as RS485, CAN or HDLC. In some embodiments, the operations as described with respect to safety unit 300 are implemented in a complex having variable numbers of redundant units, information indicative of the number of redundant units is exchanged between different safety units 300 via network 314.

Safety unit 300 is configured to receive information related to a quantity of redundant units from a user or an external circuit. The information is transferred to processor 302 via bus 308 and stored in computer readable medium 304 as quantity of redundant units parameter 316.

During operation, processor 302 executes a set of instructions to assure safety as described with respect to safety assurance system 100 (FIG. 1) or method 200 (FIG. 2).

Although the embodiments and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A safety assurance system for multiple redundant safety units, the system comprising:
   a unit active line (UAL);
   a safety verification line (SVL); and
   a plurality of safety units, wherein each safety unit is configured to:
      control an associated vital supervision card (VSC), wherein the associated VSC is configured to energize and de-energize an associated vital power bus through a switchable connection;
      control a switchable connection between the associated vital control bus and the UAL;
      control a switchable connection between the associated vital control bus and the SVL;
      determine a status of the UAL;
   and further wherein each safety unit is configured to:
      control a switchable connection between the associated vital power bus and a terminal of an associated test load;
      control a switchable connection between the terminal of the associated test load and an input to an associated load verification unit; and
      control a switchable connection between the input to the associated load verification unit and the SVL.

2. The system of claim 1, wherein the switchable connection between the associated vital control bus and the UAL is antivalent to the switchable connection between the associated vital control bus and the SVL.

3. The system of claim 2, wherein the switchable connection between the associated vital control bus and the UAL and the switchable connection between the associated vital control bus and the SVL are contacts of a force actuated relay on the associated VSC.

4. The system of claim 1, wherein the switchable connection between the associated vital power bus and the terminal of the associated test load is antivalent to the switchable connection through which the associated VSC is configured to energize and de-energize the vital power bus.

5. The system of claim 4, wherein the switchable connection between the associated vital power bus and the terminal of the associated test load and the switchable connection through which the associated VSC is configured to energize and de-energize the vital power bus are contacts of a force actuated relay on the associated VSC.

6. The system of claim 4, wherein the associated test load is a resistor and the associated load verification unit is a current sense circuit.

7. The system of claim 1, wherein the associated vital power bus is configured to energize an associated control unit input/output circuit.

8. A method of assuring safety for a multiple redundant system, the method comprising:
   verifying, by a first safety unit, a unit active line (UAL) status, wherein the UAL status indicates an active state of at least one of the first safety unit and one or more redundant safety units;
   verifying, by the first safety unit, a safety verification line (SVL) status, wherein the SVL status indicates a disconnected state of the first safety unit and each of one or more redundant safety units; and
   based on at least one of verifying the UAL status to ensure that the UAL is not energized and verifying the SVL status to ensure that the SVL is not energized, controlling the multiple redundant system by the first safety unit, wherein controlling the multiple redundant system comprises energizing the UAL.

9. The method of claim 8, wherein, after initiating controlling the multiple redundant system by the first safety unit:
   verifying the UAL status comprises one or both of verifying that the UAL is energized and periodically de-energizing and re-energizing the UAL; and
   verifying the SVL status comprises one or both of verifying that the SVL is not energized and periodically energizing and de-energizing the SVL.

10. The method of claim 8, further comprising:
   verifying an expected test load on the SVL, the expected test load being based on a quantity of the one or more redundant safety units.

11. The method of claim 10, wherein verifying the expected test load on the SVL comprises measuring a resistor associated with the first safety unit in parallel with a resistor or resistors associated with each of the one or more redundant safety units.

12. The method of claim 11, wherein, prior to measuring the resistor associated with the first safety unit in parallel with the resistor or resistors associated with each of the one or more redundant safety units, measuring only the resistor associated with the first safety unit.

13. A first safety unit for a multiple redundant system, comprising:
   a processor; and
   a non-transitory computer readable medium connected to the processor, wherein the non-transitory computer readable medium is configured to store instructions for:
      verifying a unit active line (UAL) status, wherein the UAL status indicates an active state of at least one of the first safety unit and one or more redundant safety units;
      verifying a safety verification line (SVL) status, wherein the SVL status indicates a disconnected state of the first safety unit and each of one or more redundant safety units; and
      based on at least one of verifying the UAL status to ensure that the UAL is not energized and verifying the SVL status to ensure that the SVL is not energized, controlling the multiple redundant system, wherein controlling the multiple redundant system comprises energizing the UAL.

14. The first safety unit of claim 13, wherein, while the first safety unit is controlling the multiple redundant system:
   verifying the UAL status comprises one or both of verifying that the UAL is energized and periodically de-energizing and re-energizing the UAL; and
   verifying the SVL status comprises one or both of verifying that the SVL is not energized and periodically energizing and de-energizing the SVL.

15. The first safety unit of claim 13, wherein the non-transitory computer readable medium is further configured to store instructions for:

verifying an expected test load on the SVL, the expected test load being based on a number of the one or more redundant safety units.

16. The first safety unit of claim 15, wherein verifying the expected test load on the SVL comprises measuring a resistor associated with the first safety unit in parallel with a resistor or resistors associated with each of the one or more redundant safety units.

17. The first safety unit of claim 16, wherein, prior to measuring the resistor associated with the first safety unit in parallel with the resistor or resistors associated with each of the one or more redundant safety units, measuring only the resistor associated with the first safety unit.

* * * * *